United States Patent
Jansen et al.

(10) Patent No.: US 8,551,359 B2
(45) Date of Patent: Oct. 8, 2013

(54) LIQUID-CRYSTALLINE COMPOUNDS AND LIQUID-CRYSTALLINE MEDIA

(75) Inventors: Axel Jansen, Darmstadt (DE); Helmut Haensel, Muehltal (DE); Malgorzata Rillich, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 86 days.

(21) Appl. No.: 13/086,657

(22) Filed: Apr. 14, 2011

(65) Prior Publication Data

US 2011/0253935 A1    Oct. 20, 2011

(30) Foreign Application Priority Data

Apr. 17, 2010 (DE) .................. 10 2010 015 369

(51) Int. Cl.
*C09K 19/12* (2006.01)
*C09K 19/30* (2006.01)
*C09K 19/52* (2006.01)
*C09K 19/00* (2006.01)
*C07C 41/00* (2006.01)
*C07C 43/00* (2006.01)

(52) U.S. Cl.
USPC ............. 252/299.66; 252/299.01; 252/299.6; 252/299.63; 428/1.1; 428/1.3; 349/182; 568/630; 568/631; 568/642

(58) Field of Classification Search
USPC ............. 252/299.01, 299.6, 299.63, 299.66; 428/1.1, 1.3; 349/1, 56, 182; 568/630, 631, 568/642
See application file for complete search history.

(56) References Cited

U.S. PATENT DOCUMENTS

| | | | |
|---|---|---|---|
| 6,325,949 B1 | 12/2001 | Takeshita et al. | |
| 7,105,210 B2* | 9/2006 | Heckmeier et al. | 428/1.1 |
| 7,291,367 B2 | 11/2007 | Kirsch et al. | |
| 7,604,851 B2 | 10/2009 | Heckmeier et al. | |
| 7,767,277 B2 | 8/2010 | Lietzau et al. | |
| 7,842,358 B2* | 11/2010 | Czanta et al. | 428/1.1 |
| 8,211,513 B2* | 7/2012 | Jansen et al. | 252/299.61 |
| 2004/0173776 A1 | 9/2004 | Heckmeier et al. | |
| 2006/0061699 A1 | 3/2006 | Kirsch et al. | |
| 2009/0059157 A1 | 3/2009 | Haseba et al. | |

FOREIGN PATENT DOCUMENTS

| | | |
|---|---|---|
| DE | 102 43 776 | 4/2003 |
| DE | 10353658 A1 | 6/2004 |
| DE | 10 2007 009944 | 9/2007 |
| EP | 1046693 A1 | 4/2000 |
| EP | 1454975 A2 | 2/2004 |
| EP | 1 900 792 | 3/2008 |
| JP | 2002 327175 | 11/2002 |
| JP | 2002-327175 A | 11/2002 |
| JP | 2003-261478 A | 9/2003 |
| WO | WO-2004 048501 | 6/2004 |

OTHER PUBLICATIONS

Chisso Corp., "Liquid crystal composition and liquid crystal display device," Patent Abstracts of Japan, Publication Date: Nov. 15, 2002; English Abstract of JP-2002 327175.
European Search Report for EP 11 00 2803 dated Jun. 14, 2011.
Merck Patent GMBH, "Flussigkristallines Medium," Espacenet, Publication Date: Sep. 20, 2007; English Abstract of DE-10 2007 009944.

* cited by examiner

*Primary Examiner* — Geraldina Visconti
(74) *Attorney, Agent, or Firm* — Millen, White, Zelano & Branigan, P.C.

(57) ABSTRACT

The present invention relates to liquid-crystalline compounds having two fluorinated biphenyl units, a terminal trifluoromethyl or trifluoromethoxy group and a —$CF_2O$— bridge between the two fluorinated biphenyl units. The invention also relates to liquid-crystalline media prepared therewith and to liquid-crystal display devices (LC displays) containing these media.

20 Claims, No Drawings

LIQUID-CRYSTALLINE COMPOUNDS AND LIQUID-CRYSTALLINE MEDIA

The present invention relates to liquid-crystalline compounds having two fluorinated biphenyl units, a terminal trifluoromethyl or trifluoromethoxy group and a —CF$_2$O— bridge between the two fluorinated biphenyl units. The invention also relates to liquid-crystalline media prepared therewith and to liquid-crystal display devices (LC displays) containing these media.

Liquid-crystalline media have been used for some time in LC displays in order to display information. Highly polar compounds having 4 rings and one —CF$_2$O— bridge have already been proposed for display devices, for example in the specifications DE 10353658 A1 and EP 1454975 A2. The specification US 2009/0059157 A1 discloses LC displays which operate in the optically isotropic blue phase.

Besides the displays with nematic liquid crystals which are well known to the person skilled in the art, applications based on media having a blue phase are also increasingly being developed. These are distinguished by particularly short response times. In display applications in which electro-optical effects of the liquid-crystalline blue phases are utilised, the para-meters Δ∈ and Δn, in particular, are of crucial importance.

The basis for the fast switching operations in these phases is the so-called Kerr effect. The Kerr effect is the change in birefringence of an optically transparent and isotropic material caused by an external electric field. The change in birefringence is given by the following equation:

$$\Delta n_{induced} = \lambda \cdot K \cdot E^2$$

where $\Delta n_{induced}$ is the induced birefringence, K is the Kerr constant, and E is the applied electric field. λ represents the wavelength. Unusually high Kerr constants are observed for materials in the blue phase.

Kikuchi et al. describe the dependence of the Kerr constant on the LC material properties [H. Kikuchi et al., *Appl. Phys. Lett.* 2008, 92, 043119]. Accordingly, the Kerr constant is proportional to the product of birefringence and dielectric anisotropy of the liquid-crystalline medium:

$$K \sim \Delta n \cdot \Delta \in$$

For fast switching processes and low switching voltages, materials having high values of the Kerr constant and thus high values of the product Δn·Δ∈ are required.

The specifications JP 2003261478 A, EP 1046693 A1 and JP 2002327175 A disclose structural formulae of LC components which contain two optionally fluorinated biphenyl groups connected by a bridging group of the formula —CF$_2$—O—. The structural formulae are substituted at the opposite terminal positions by in each case a nonpolar group (for example alkyl) and a polar group (for example F, OCF$_3$, CF$_3$, Cl, etc.). The documents do not disclose any compounds in accordance with the invention since they differ in the positions of the fluorination and/or in the nature of the terminal polar substituent. In addition, no physical data are disclosed for similar compounds which give a conclusion about their suitability for liquid-crystalline media.

It is an object of the present invention to provide compounds having advantageous properties for use in liquid-crystalline media. In particular, they should be suitable for use in displays which use media having polymer-stabilised blue phases. Materials are required here which enable fast switching, have a good voltage holding ratio (VHR), require low voltages for the switching process ($V_{op}$), have high clearing points, exhibit low hysteresis, have a low memory effect and are stable to exposure to light and heat. In addition, the individual compounds should have adequate solubility in nematic LC media or themselves have a broad nematic phase range.

It is a further object of the invention to provide liquid-crystalline media which are essentially free from ester compounds or nitriles in order to increase the electrical resistance of the mixtures and the long-term stability thereof. The liquid-crystalline media known to date for operation in the optically isotropic blue phase sometimes still comprise, for example, compounds of the formula

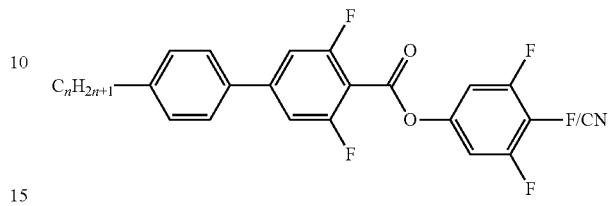

in which n=3–5,
to be replaced by compounds having similar physical properties and more pronounced stability.

This object is achieved in accordance with the invention by compounds of the general formula I. Surprisingly, it has also been found that liquid-crystalline media having a suitable nematic phase range, high dielectric anisotropy Δ∈ and high Δn which do not have the disadvantages of the prior-art materials, or at least only do so to a considerably reduced extent, can be achieved with the compounds according to the invention. Substantially the same requirements are made of highly polar substances for purely nematic displays.

The invention relates to compounds of the formula I

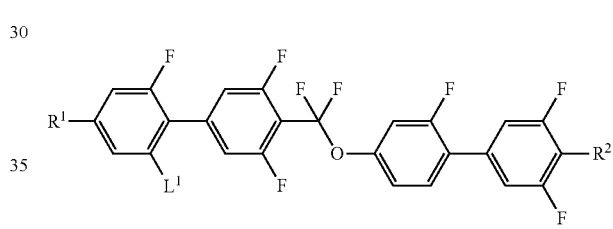

in which
L$^1$ denotes H or F, preferably H,
R$^1$ denotes an unsubstituted alkyl radical having 1 to 15 C atoms, where, in addition, one or more CH$_2$ groups in this radical may each be replaced, independently of one another, by —C≡C—, —CH═CH—, —CF═CF—, —CF═CH—, —CH═CF—, —(CO)O—, —O(CO)—, —(CO)— or —O— in such a way that O atoms are not linked directly to one another,
and
R$^2$ denotes CF$_3$ or OCF$_3$, preferably CF$_3$.

The compounds according to the invention have a relatively high clearing point, extremely high dielectric anisotropy (Δ∈), high optical anisotropy (Δn) and low rotational viscosity. They have, alone or mixed with further meso-genic components, a nematic phase over a broad temperature range. These properties make them suitable for use in liquid-crystalline media, for example for displays of the TN-TFT, IPS, FFS, 'blue-phase', HT-VA, etc., type, characterised by media having positive dielectric anisotropy, which are familiar to the person skilled in the art. They are particularly suitable for use in media in the region of the blue phase.

The radical R$^1$ preferably denotes an alkyl radical having 1 to 15 C atoms, where, in addition, one or more CH$_2$ groups in this radical may each be replaced, independently of one another, by —C≡C—, —CH═CH—, —(CO)O—, —O(CO)—, —(CO)— or —O— in such a way that O atoms are not linked directly to one another. R$^1$ particularly preferably denotes an unsubstituted alkyl, alkenyl or alkoxy, in particular alkyl, and very particularly preferably a straight-chain alkyl having 1 to 12 C atoms.

Illustrative preferred embodiments of the invention are therefore, inter alia, the following structures:

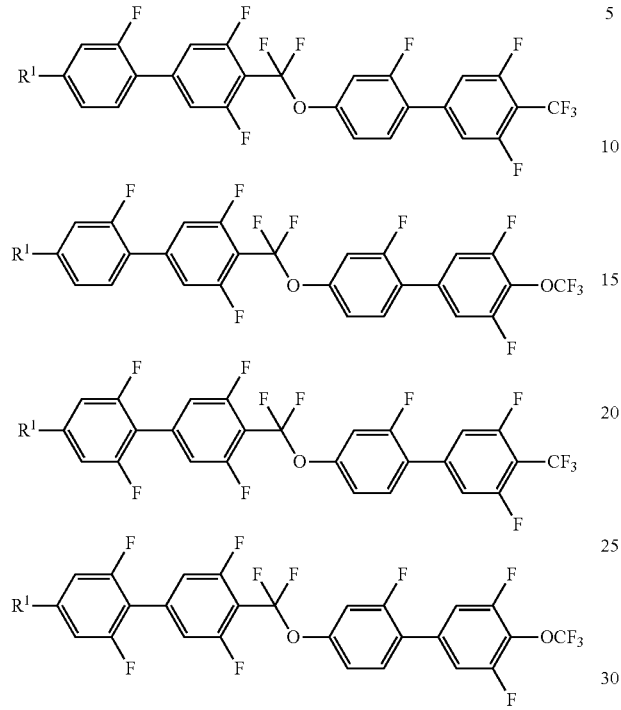

in which $R^1$ is as defined above, preferably a straight-chain alkyl group of the formula —$C_n H_{2n+1}$, in which n=1, 2, 3, 4, 5, 6 or 7, in particular 3.

The compounds of the formula I can advantageously be prepared as evident from the following illustrative synthesis (Schemes 1-3):

The compounds I are particularly preferably prepared by a palladium-promoted cross-coupling reaction (Suzuki coupling) of the building blocks 2 with boronic acids 1.

Scheme 1: Synthesis of the compounds I using the building blocks 2

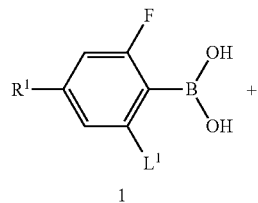

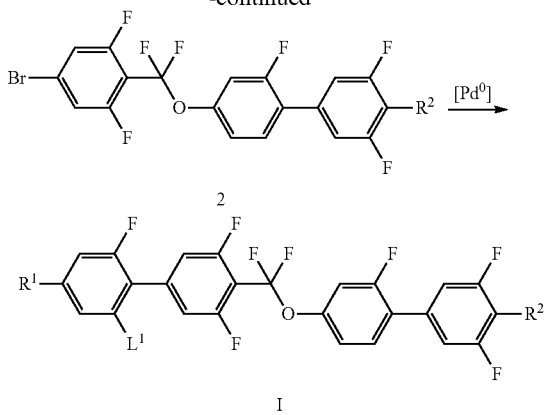

The roles of electrophile and nucleophile may also be exchanged (Scheme 2). Boronic acid esters 4 or the corresponding boronic acids are then preferred starting compounds. These are reacted with suitable electrophiles 3, where X is preferably Br, I or triflate (OTf).

Scheme 2: Synthesis of the compounds I using the building blocks 4

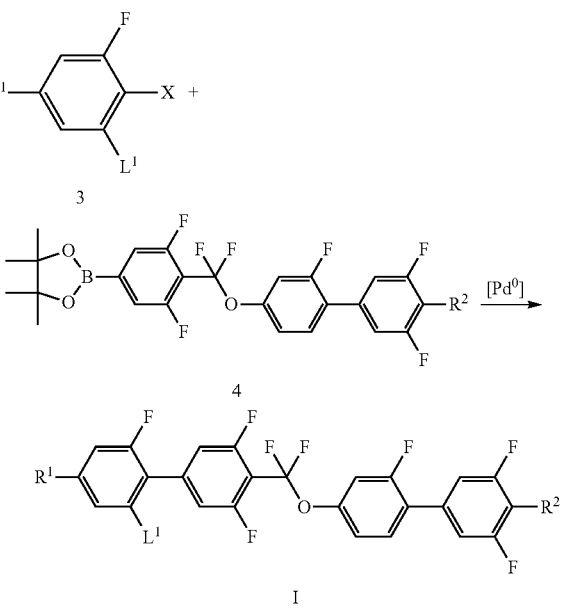

The starting materials required can be prepared analogously to the processes known to the person skilled in the art and described in standard works of organic chemistry, such as, for example, in Houben-Weyl, Methoden der organischen Chemie [Methods of Organic Chemistry], Thieme-Verlag, Stuttgart.

The starting materials 2 and 4 are synthesised as shown in Scheme 3.

Scheme 3: Synthesis of compounds 2 and 4

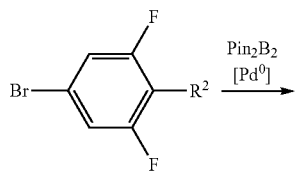

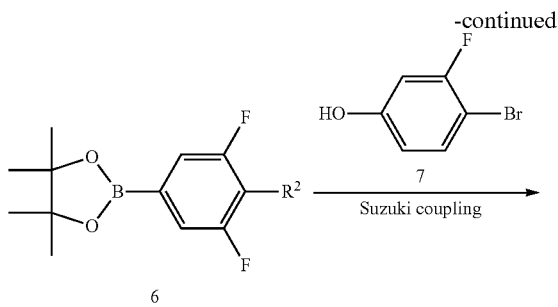

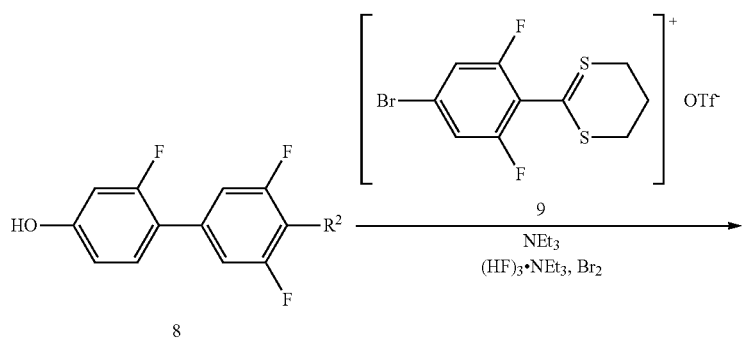

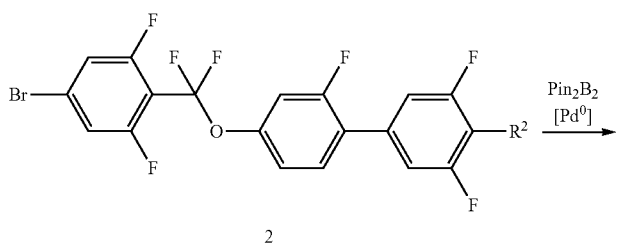

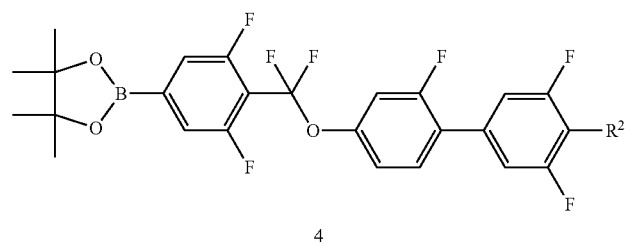

Firstly, the boronic acid esters 6 are prepared from the corresponding bromides 5. This is carried out by a palladium-promoted borylation using bis(pinacolato)diboron (Pin$_2$B$_2$). The compounds are then coupled to 4-bromo-2-fluorophenol 7 (Suzuki coupling). The phenols 8 are reacted with the dithianylium salt 9 in the presence of base, and the respective adduct is subjected directly to oxidative desulfuration [P. Kirsch, M. Bremer, A. Taugerbeck, T. Wallmichrath, *Angew. Chem. Int. Ed.* 2001, 40, 1480-1484]. This gives the compounds 2. The palladium-promoted borylation using bis(pinacolato)diboron (Pin$_2$B$_2$) then gives the compounds 4.

The invention therefore also encompasses a process for the preparation of compounds of the formula I which comprises a reaction step in which two starting materials of the formulae A and B:

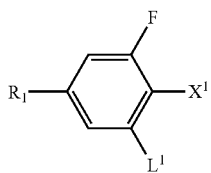

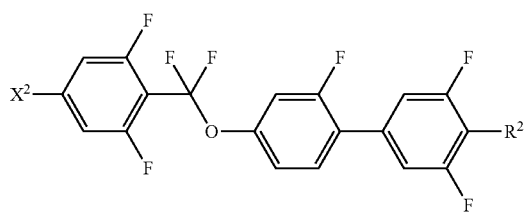

in which $R^1$, $R^2$ and $L^1$ are as defined for formula I, and
$X^1$ or $X^2$ denotes —$B(OH)_2$, a boronic acid ester or a boronate salt,
and the other radical denotes Cl, Br, I or —$O(SO_2)CF_3$,
are reacted in the presence of a suitable transition-metal catalyst. The preferred transition metal is palladium.

The liquid-crystalline media in accordance with the present invention comprise one or more compounds of the formula I and optionally at least one further, preferably mesogenic compound. The liquid-crystal media therefore preferably comprise two or more compounds. Preferred media comprise the preferred compounds of the formula I.

The liquid-crystalline media according to the invention preferably have positive dielectric anisotropy. They can be designed in such a way that they have very high dielectric anisotropy combined with high optical anisotropy.

Preferred further compounds for the liquid-crystalline media in accordance with the invention are selected from the compounds of the formulae II and III:

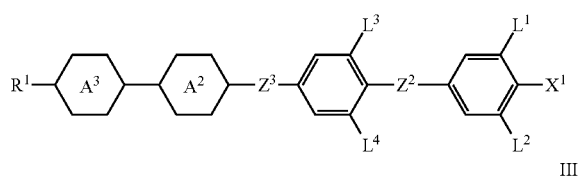

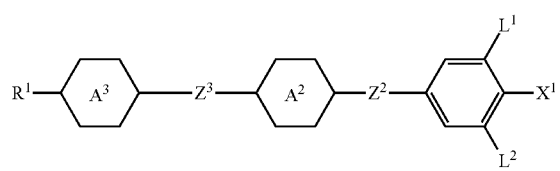

in which
$R^1$ in each case, independently of one another, denotes an un-substituted alkyl radical having 1 to 15 C atoms, where, in addition, one or more $CH_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms,
$A^2$, $A^3$, independently of one another, denote

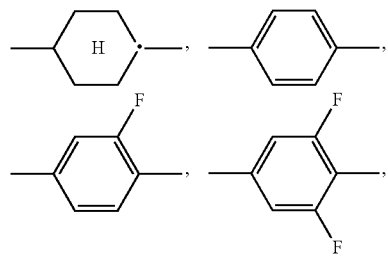

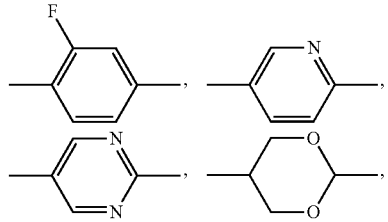

$Z^2$, $Z^3$, independently of one another, denote a single bond, $CF_2O$, $CH_2CH_2$, $CF_2CH_2$, $CF_2CF_2$, CFHCFH, CFHCH_2, (CO)O, $CH_2O$, C≡C, CH=CH, CF=CH, CF=CF, where asymmetrical bonding units (for example $CF_2O$) may be oriented in both possible directions,
$X^1$ denotes F, Cl, CN, or
alkyl, alkenyl, alkenyloxy, alkylalkoxy or alkoxy having 1 to 3 C atoms, which is mono- or polysubstituted by F, and
$L^1$ to $L^4$ denote H or F.

The liquid-crystalline media preferably comprise between 10 and 50% by weight of compounds of the formula I. In the case of a total content of more than 10%, two or more compounds of the formula I with different chain lengths in the radical $R^1$ are preferably employed.

The liquid-crystalline media preferably comprise between 20 and 40% by weight of compounds of the formula II. The compounds of the formula III are preferably, if present, employed in amounts of up to 20% by weight. The remaining other compounds, if present, are selected from further compounds having high dielectric anisotropy, high optical anisotropy and preferably a high clearing point.

Liquid-crystalline media having disproportionately high dielectric anisotropies can be achieved through a high content of the compounds of the formula I, preferably supplemented by compounds of the formulae II and III.

Preferred compounds of the formula II are those of the formula IIa:

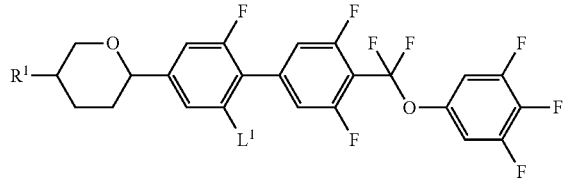

in which $R^1$ and $L^1$ are as defined for formula II.

Preferred compounds of the formula III are those of the formula IIIa or IIIb:

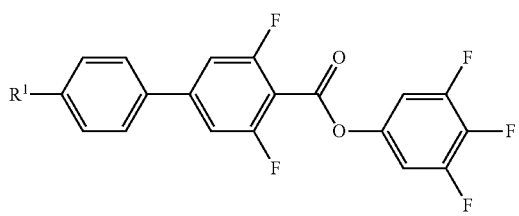

IIIb

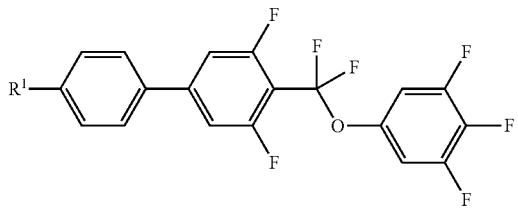

in which R¹ is as defined for formula III.

The invention furthermore relates to the use of the compounds of the formula I in liquid-crystalline media or in electro-optical displays, preferably in media and displays having an optically isotropic liquid-crystalline phase, preferably having a blue phase. This phase is preferably stabilised by a polymer, which is preferably formed in the liquid-crystalline medium by polymerisation of corresponding monomers. In general, the monomer content of the medium is polymerised at a temperature at which it is in the blue phase. The stability range of this phase is thus broadened. A considerable improvement in the hitherto achievable properties of the polymer-stabilised media in the blue phase is associated with the compounds and media according to the invention.

The liquid-crystalline media may in addition comprise further additives, such as stabilisers, chiral dopants and nanoparticles. The individual compounds added are employed in concentrations of preferably 0.1 to 6%. The concentrations of the individual compounds used are preferably in each case in the range from 0.1% to 3%. However, the concentration data for the other constituents of the liquid-crystal mixtures, i.e. the liquid-crystalline or mesogenic compounds and if appropriate the polymerisation components, are indicated without taking into account the concentration of these additives.

The liquid-crystalline media preferably comprise 0.01 to 10% by weight of an optically active, chiral dopant. This supports the formation of a liquid-crystalline blue phase. For blue phases, chiral dopants having a high HTP ('helical twisting power) are preferably employed, typically in the range 2-5% by weight.

The media according to the invention preferably comprise one or more polymerisable compounds (monomers) or are stabilised by a polymer obtained therefrom, where the polymerisation is preferably carried out in the blue phase.

The liquid-crystalline media preferably comprise 0 to 10% by weight, in particular 0.01 to 5% by weight and particularly preferably 0.1 to 3% by weight, of stabilisers. The media preferably comprise one or more stabilisers selected from 2,6-di-tert-butylphenols, 2,2,6,6-tetramethylpiperidines or 2-benzotriazol-2-ylphenols. These assistants are known to the person skilled in the art and are commercially available, for example as light stabilisers.

An embodiment of the invention is therefore also a process for the preparation of a liquid-crystal medium which is characterised in that one or more compounds of the formula I are mixed with one or more liquid-crystalline compounds, preferably selected from the formulae II and III, optionally with one or more further compounds and optionally with one or more additives. The polymerisable content of the liquid-crystalline medium is optionally subsequently polymerised.

The present invention furthermore relates to the use of the compounds or media according to the invention in an electro-optical device, preferably a liquid-crystal display, and to such devices themselves. The displays preferably operate at least partly in the region of the blue phase, which is preferably a polymer-stabilised blue phase. The media and displays alternatively also preferably operate in the nematic phase.

A polymer-stabilised device according to the invention is preferably produced by carrying out the polymerisation of the polymerisable constituents of the medium in the device itself, i.e. in the opto-electronic cell.

The structure of the electro-optical display device according to the invention preferably consists of a cell comprising two substrates opposite one another which enclose the liquid-crystalline medium, and of electrodes mounted in the cell. The electrodes are preferably designed in such a way that they are able to generate an electric field which has a component aligned parallel to the substrates (or perpendicular to the light axis) in the liquid-crystalline medium. The electrodes are preferably applied to one of the substrates as comb electrodes (interdigital electrodes). It is preferred for one or both substrates to be transparent. In the case of displays which operate in the blue phase, the optically isotropic medium becomes birefringent through the application of a voltage. An optical switching operation is achieved together with correspondingly arranged polarisers.

In the present application, the term dielectrically positive describes compounds or components where $\Delta\epsilon>3.0$, dielectrically neutral describes compounds or components where $-1.5\leq\Delta\epsilon\leq3.0$, and dielectrically negative describes compounds or components where $\Delta\epsilon<-1.5$. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitance of the test mixtures is determined both in a cell with homeotropic alignment and also in a cell with homogeneous alignment. The cell thickness in the case of both cell types is about 20 μm. The applied voltage is a rectangular wave having a frequency of 1 kHz and an effective value of typically 0.5 V to 1.0 V, but is always selected so that it is below the capacitive threshold for the respective test mixture.

The host mixture used for dielectrically positive compounds is mixture ZLI-4792 and the host mixture used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components and liquid-crystalline media which have a nematic phase at the measurement temperature of 20° C. are measured as such, all others are treated like compounds.

The parameter ranges indicated in this application all include the limit values, unless expressly indicated otherwise.

Throughout the application, unless expressly indicated otherwise, the following conditions and definitions apply. All concentrations are indicated in percent by weight and in each case relate to the mixture as a whole. All temperatures, such as, for example, the melting point T(C,N) or T(C,S), the transition from the smectic phase (S) to the nematic phase (N) T(S,N) and the clearing point T(N,I), of the liquid crystals are indicated in degrees Celsius. All temperature differences are indicated in differential degrees. All physical properties which are typical of liquid crystals are, unless indicated otherwise, determined in accordance with "Merck Liquid Crystals, Physical Properties of Liquid Crystals", status November 1997, Merck KGaA, Germany, and are shown for a temperature of 20° C. The optical anisotropy (Δn) is determined at a wavelength of 589.3 nm. Δ∈ is defined as (∈$_∥$−∈$_⊥$), while ∈$_{ave}$ is (∈$_∥$+2 ∈$_⊥$)/3.

The threshold voltages and all other electro-optical properties are determined using test cells produced at Merck KGaA, Germany. The test cells for the determination of Δ∈ have a layer thickness of about 20 μm. The electrode is a circular ITO electrode having an area of 1.13 cm² and a protective ring. The alignment layers are SE-1211 from Nissan Chemicals, Japan, for homeotropic alignment (∈$_∥$) and polyimide AL-1054 from Japan Synthetic Rubber, Japan, for homogeneous alignment (∈$_{195}$). The capacitance values are determined using a Solatron 1260 frequency response analyser using a sine wave with a voltage of 0.3 V$_{rms}$. The light used in the electro-optical measurements is white light. A set-up with a commercially available DMS instrument from Autronic-Melchers, Germany, is used here. The characteristic voltages are determined with perpendicular observation. The threshold voltage (V$_{10}$), "mid-grey voltage" (V$_{50}$) and saturation voltage (V$_{90}$) are determined for a relative contrast of 10%, 50% and 90% respectively.

The values for the components of the properties perpendicular and parallel to the director of the liquid crystal are obtained by alignment of the liquid crystal in a magnetic field. For this purpose, the magnetic field of a permanent magnet is used. The strength of the magnetic field is 0.35 tesla. The alignment of the magnet is set correspondingly and then rotated correspondingly through 90°.

In the present application, unless expressly indicated otherwise, the term compounds denotes both one compound and also a plurality of compounds.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are C$_2$- to C$_7$-1 E-alkenyl, C$_4$- to C$_7$-3E-alkenyl, C$_5$- to C$_7$-4-alkenyl, C$_6$- to C$_7$-5-alkenyl and C$_7$-6-alkenyl, in particular C$_2$- to C$_7$-1 E-alkenyl, C$_4$- to C$_7$-3E-alkenyl and C$_5$- to C$_7$-4-alkenyl. Examples of further preferred alkenyl groups are vinyl, 1 E-propenyl, 1 E-butenyl, 1 E-pentenyl, 1 E-hexenyl, 1 E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "alkoxy" preferably encompasses straight-chain radicals of the formula C$_n$H$_{2n+1}$—O—, in which n denotes 1 to 10. n is preferably 1 to 6. Preferred alkoxy groups are, for example, methoxy, ethoxy, n-propoxy, n-butoxy, n-pentoxy, n-hexoxy, n-heptoxy, n-octoxy, n-nonoxy, n-decoxy.

The term "oxaalkyl" or "alkoxyalkyl" preferably encompasses straight-chain radicals of the formula C$_n$H$_{2n+1}$—O—(CH$_2$)$_m$, in which n and m each, independently of one another, denote 1 to 10. Preferably, n is 1 and m is 1 to 6.

The term "fluorinated alkyl radical" preferably encompasses mono- or poly-fluorinated radicals. Perfluorinated radicals are included. Particular preference is given to CF$_3$, CH$_2$CF$_3$, CH$_2$CHF$_2$, CHF$_2$, CH$_2$F, CHFCF$_3$ and CF$_2$CHFCF$_3$.

The term "fluorinated alkoxy radical" preferably encompasses mono- or polyfluorinated radicals. Perfluorinated radicals are included. Particular preference is given to OCF$_3$.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in lesser amount is dissolved in the compound used in greater amount. If the temperature is above the clearing point of the compound used in higher concentration, the completion of the dissolution process is particularly easy to observe. However, it is also possible to prepare the media in other conventional ways, for example using so-called premixes, which may be, for example, homologous or eutectic mixtures of compounds, or using so-called "multibottle" systems, whose constituents are themselves ready-to-use mixtures.

In the present application, unless expressly indicated otherwise, the plural form of a term denotes both the singular form and also the plural form, and vice versa.

Further combinations of the embodiments and variants of the invention in accordance with the description also arise from the claims.

Further abbreviations:
THF tetrahydrofuran
MTBE methyl tert-butyl ether
SiO$_2$ silica gel for chromatography The following examples explain the present invention without restricting it in any way.

However, the physical properties make it clear to the person skilled in the art what properties can be achieved and in what ranges they can be modified. In particular, the combination of the various properties which can preferably be achieved is thus well defined for the person skilled in the art.

EXAMPLES

Example 1

4-[Difluoro(3,5,2'-trifluoro-4'-propylbiphenyl-4-yl)methoxy]-6,3',5'-trifluoro-4'-trifluoromethylbiphenyl ("GUQGU-3-T")

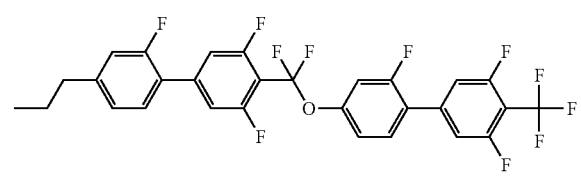 [SMILES: CCCc1ccc(-c2cc(F)c(C(F)(F)Oc3ccc(-c4cc(F)c(C(F)(F)F)c(F)c4)c(F)c3)c(F)c2)c(F)c1]

The compound 4-[difluoro(3,5,2'-trifluoro-4'-propylbiphenyl-4-yl)methoxy]-6,3',5'-trifluoro-4'-trifluoromethylbiphenyl according to the invention is pre-pared as described below:

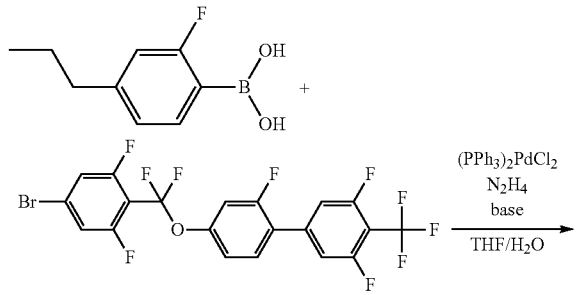

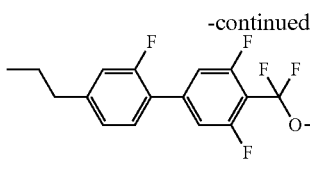

A mixture of 2.60 g (14.3 mmol) of 2-fluoro-4-propylbenzeneboronic acid, 7.0 g (13.1 mmol) of 4'-[(4-bromo-2,6-difluorophenyl)difluoromethoxy]-3,5,2'-trifluoro-4-trifluoromethylbiphenyl, 0.30 g (0.42 mmol) of bis(triphenylphosphine)palladium(II) chloride and 2.80 g (10.1 mmol) of sodium metaborate octahydrate is initially introduced in 40 ml of THF/water=3:1. 0.02 ml (0.4 mmol) of hydrazinium hydroxide is added, and the mixture is refluxed for 20 h. After cooling, the batch is diluted with MTBE, and the mixture is washed with water. The organic phase is separated off, and the aqueous phase is extracted with MTBE. The combined organic phases are washed with water. The solution is dried using sodium sulfate and concentrated to dryness. The residue is purified by column chromatography ($SiO_2$, n-heptane). The further purification is carried out by recrystallisation from ethanol and n-heptane, giving 4-[difluoro(3,5,2'-trifluoro-4'-propyl-biphenyl-4-yl)methoxy]-6,3',5'-trifluoro-4'-trifluoromethylbiphenyl as a colourless solid.

C 80 N 95 I
cl.p.=51° C.
$\Delta\varepsilon$=43.7
$\Delta n$=0.172
$\gamma_1$=643 mPa·s
$\Delta\varepsilon\cdot\Delta n$=7.5

$^1$H-NMR (300 MHz, $CHCl_3$): $\delta$=7.46-7.39 (m, 1H, $H_{arom.}$), 7.37-7.31 (m, 1H, $H_{arom.}$), 7.25-7.16 (m, 6H, $H_{arom}$), 7.09-6.99 (m, 2H, $H_{arom.}$), 2.64 (t, 2H, J=7.9 Hz, —$CH_2CH_2CH_3$), 1.75-1.62 (m, 2H, —$CH_2CH_2CH_3$), 0.98 (t, 3H, J=7.3 Hz, —$CH_2CH_2CH_3$).

$^{19}$F-NMR (282 MHz, $CHCl_3$): $\delta$=−56.3 (t, 3F, J=21.9 Hz, —$CF_3$), −61.0 (t, 2F, J=25.9 Hz, —$OCF_2$—), −110.4 to −110.9 (m, 4F, $F_{arom.}$), −113.5 to −113.6 (m, 1F, $F_{arom.}$), −117.8 (dd, 1F, J=12.3 Hz, J=8.3 Hz, $F_{arom.}$).

MS (EI): m/e (%)=590 (1, M$^+$), 571 (3, [M−F]$^+$), 299 (100).

Example compounds 2-5 are obtained analogously to Example 1. The spectroscopic data (NMR, MS) in each case correspond to the structures.

2

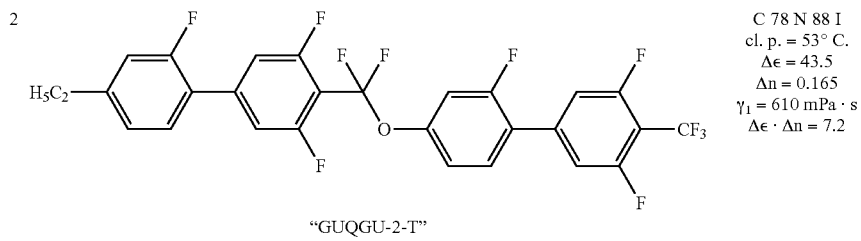

C 78 N 88 I
cl. p. = 53° C.
$\Delta\epsilon$ = 43.5
$\Delta n$ = 0.165
$\gamma_1$ = 610 mPa · s
$\Delta\epsilon \cdot \Delta n$ = 7.2

"GUQGU-2-T"

3

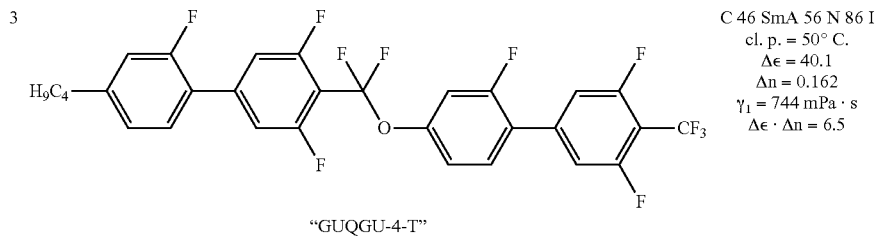

C 46 SmA 56 N 86 I
cl. p. = 50° C.
$\Delta\epsilon$ = 40.1
$\Delta n$ = 0.162
$\gamma_1$ = 744 mPa · s
$\Delta\epsilon \cdot \Delta n$ = 6.5

"GUQGU-4-T"

4

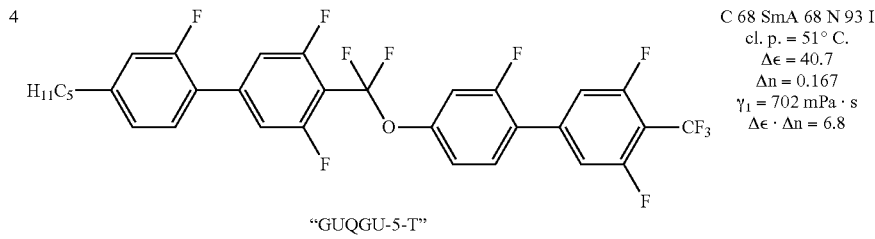

C 68 SmA 68 N 93 I
cl. p. = 51° C.
$\Delta\epsilon$ = 40.7
$\Delta n$ = 0.167
$\gamma_1$ = 702 mPa · s
$\Delta\epsilon \cdot \Delta n$ = 6.8

"GUQGU-5-T"

5

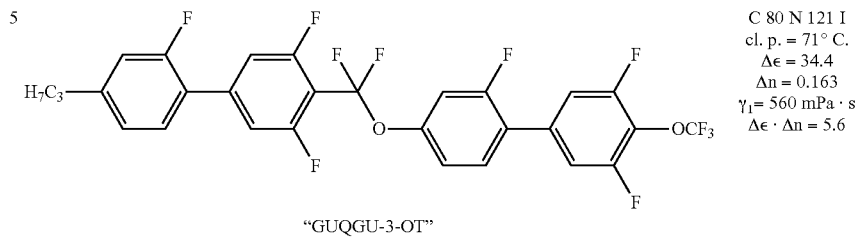

C 80 N 121 I
cl. p. = 71° C.
$\Delta\epsilon$ = 34.4
$\Delta n$ = 0.163
$\gamma_1$ = 560 mPa · s
$\Delta\epsilon \cdot \Delta n$ = 5.6

"GUQGU-3-OT"

Example 6

4-[Difluoro-(3,5,2'-trifluoro-4'-butoxybiphenyl-4-yl)methoxy]-6,3',5'-trifluoro-4'-trifluoromethylbiphenyl ("GUQGU-4O-T")

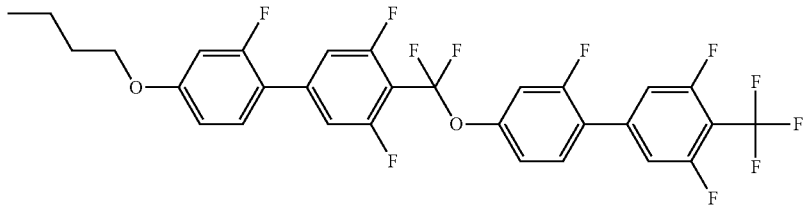 [SMILES: CCCCOc1ccc(-c2cc(F)c(C(F)(F)Oc3ccc(-c4cc(F)c(C(F)(F)F)c(F)c4)c(F)c3)c(F)c2)c(F)c1]

The compound 4-[difluoro(3,5,2'-trifluoro-4'-butoxybiphenyl-4-yl)methoxy]-6,3',5'-trifluoro-4'-trifluoromethylbiphenyl according to the invention is pre-pared as described below:

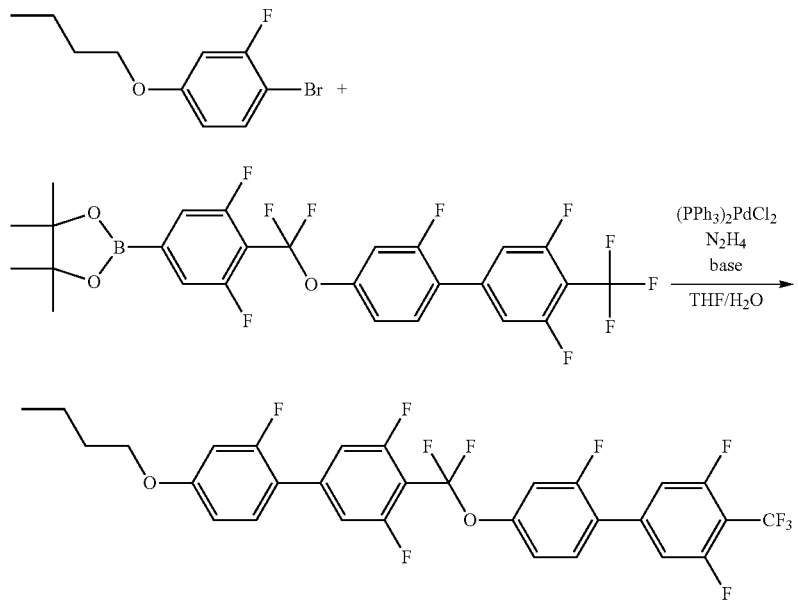

A mixture of 4.55 g (18.4 mmol) of 4-butoxy-2-fluorobromobenzene, 9.10 g (15.7 mmol) of 2-{4-[difluoro-(2,3',5'-trifluoro-4'-trifluoromethylbiphenyl-4-yloxy)methyl]-3,5-difluorophenyl}-4,4,5,5-tetramethyl-1,3,2-dioxaborolane, 0.36 g (0.50 mmol) of bis(triphenylphosphine)palladium(II) chloride and 3.35 g (12.0 mmol) of sodium metaborate octahydrate is initially introduced in 60 ml of THF/water=4:1. 0.024 ml (0.5 mmol) of hydrazinium hydroxide is added, and the mixture is refluxed for 19 h. After cooling, the batch is diluted with MTBE, and the mixture is washed with water. The organic phase is separated off, and the aqueous phase is extracted with MTBE. The combined organic phases are washed with water. The solution is dried using sodium sulfate and concentrated to dryness. The residue is purified by column chromatography (SiO$_2$, n-heptane:toluene=9:1→3:1). The further purification is carried out by recrystallisation from ethanol and n-heptane, giving 4-[difluoro(3,5,2'-trifluoro-4'-butoxybiphenyl-4-yl)methoxy]-6,3',5'-trifluoro-4'-trifluoromethylbiphenyl as a colourless solid.

C 68 SmA 95 N 126 I
cl.p.=84° C.
Δε=41.7
Δn=0.179
Δε·Δn=7.5

$^1$H-NMR (300 MHz, CHCl$_3$): δ=7.45-7.30 (m, 2H, H$_{arom.}$), 7.25-7.13 (m, 6H, H$_{arom.}$), 6.79 (dd, 1H, J=12.8 Hz, J=2.4 Hz, H$_{arom.}$), 6.71 (dd, 1H, J=8.5 Hz, J=2.4 Hz, H$_{arom.}$), 4.00 (t, 2H, J=6.3 Hz, —OCH$_2$(CH$_2$)$_2$CH$_3$), 1.85-1.74 (m, 2H, —OCH$_2$(CH$_2$)$_2$CH$_3$), 1.57-1.45 (m, 2H, —OCH$_2$(CH$_2$)$_2$CH$_3$), 0.99 (t, 3H, J=7.3 Hz, —OCH$_2$(CH$_2$)$_2$CH$_3$).

$^{19}$F-NMR (282 MHz, CHCl$_3$): δ=−56.3 (t, 3F, J=22.1 Hz, —CF$_3$), −61.0 (t, 2F, J=25.9 Hz, —OCF$_2$—), −110.4 to −110.7 (m, 2F, F$_{arom.}$), −110.9 to −111.1 (m, 2F, F$_{arom.}$), −113.5 to −113.6 (m, 1F, F$_{arom.}$), −114.5 (dd, 1F, J=12.8 Hz, J=8.8 Hz, F$_{arom.}$).

MS (EI): m/e (%)=620 (2, M$^+$), 601 (1, [M−F]$^+$), 329 (100).

Mixture Examples
The following acronyms are used to describe the components of the liquid-crystalline base mixture (host). The index n adopts a value of 1 to 9. The compounds are suitable for the preparation of liquid-crystalline media according to the invention.
TABLE A
Acronyms for LC components
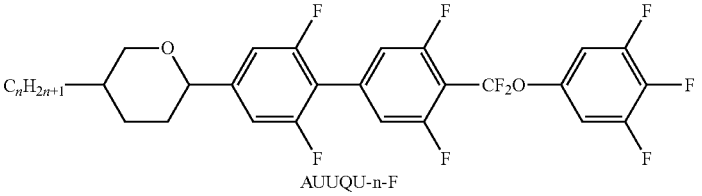
AUUQU-n-F
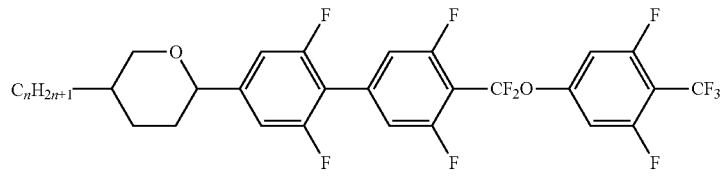
AUUQU-n-T
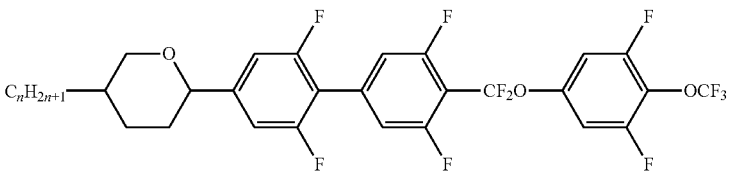
AUUQU-n-OT
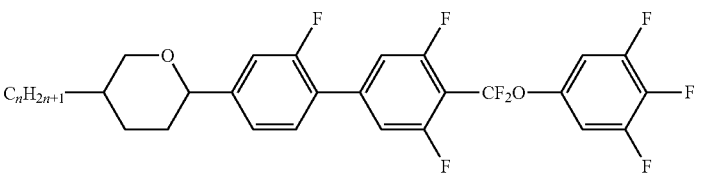
AGUQU-n-F
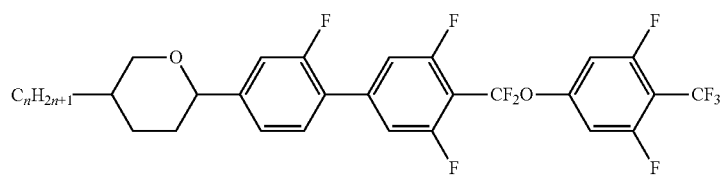
AGUQU-n-T
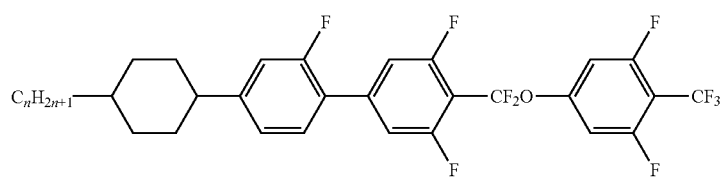
CGUQU-n-T
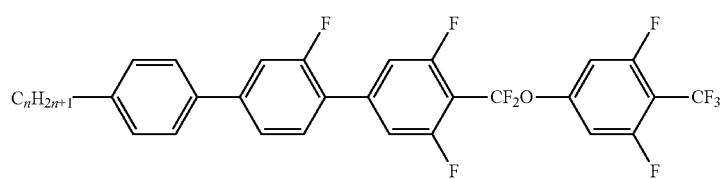
PGUQU-n-T TABLE A-continued
Acronyms for LC components
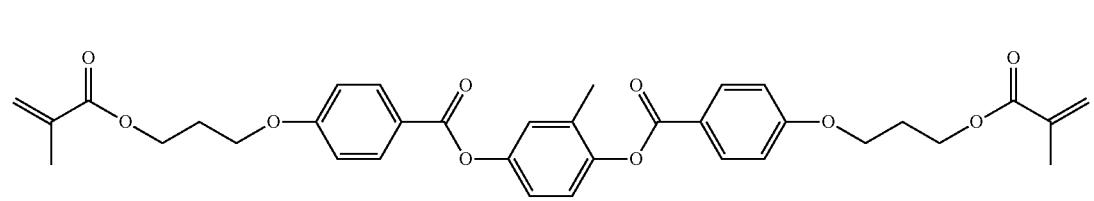
PUQU-n-F
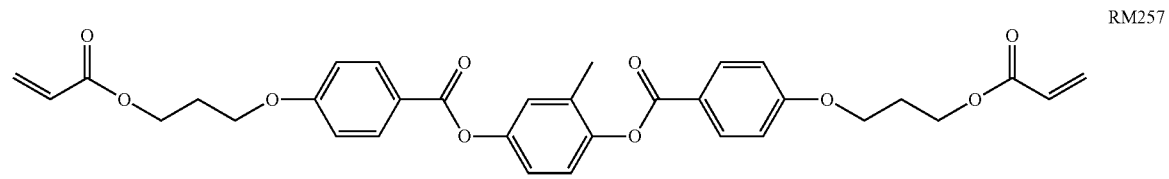
PUZU-n-F
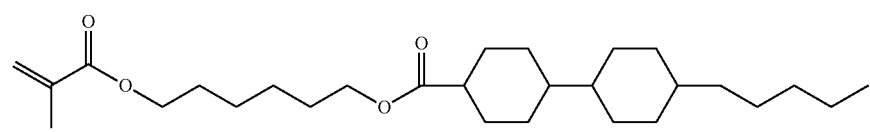
GUQGU-n-T
The following monomers are preferably used:
RM220
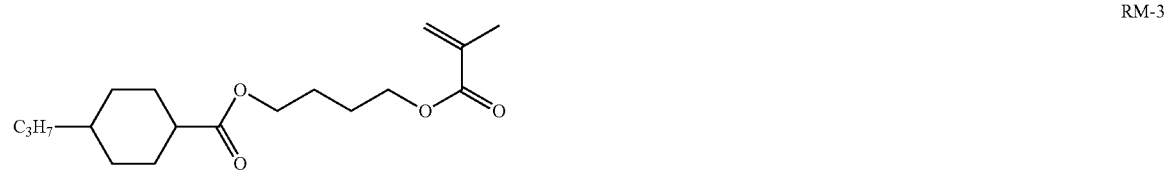
RM257
RM-2
RM-3

RM220 has the phase sequence C 82.5 N 97 I.
RM257 has the phase sequence C 66 N 127 I.
The following additives are preferably used
(DP: chiral dopant, IN: polymerisation initiator):

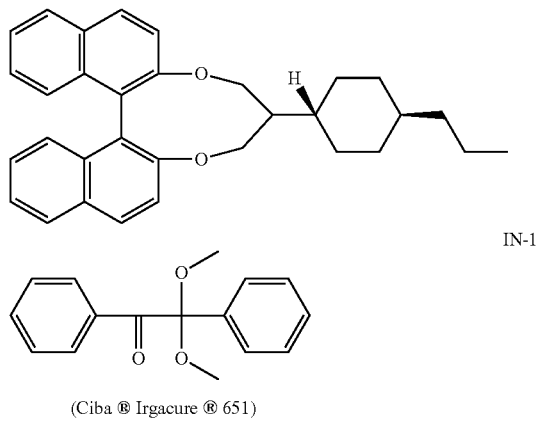

(Ciba ® Irgacure ® 651)

Further chiral dopants and polymerisation initiators for LC mixtures are known to the person skilled in the art and are expressly mentioned here.

The media are characterised as described before the polymerisation. The RM components are then polymerised by irradiation once (180 s) in the blue phase, and the media obtained are re-characterised.

Description of the Polymerisation

Before the polymerisation of a sample, the phase properties of the medium are established in a test cell having a thickness of about 10 microns and an area of 2×2.5 cm. The filling is carried out by capillary action at a temperature of 75° C. The unpolymerised medium is measured under a polarising microscope with heating stage at a heating rate of 1° C./min.

The polymerisation of the media is carried out by irradiation using a UV lamp (Hönle, Bluepoint 2.1, 365 nm interference filter) having an effective power of about 1.5 mW/cm$^2$ for 180 seconds. The polymerisation is carried out directly in the electro-optical test cell. The polymerisation is carried out initially at a temperature at which the medium is in blue phase I (BP-I). The polymerisation is carried out in a plurality of part-steps which little by little result in complete polymerisation. The temperature range of the blue phase generally changes during the polymerisation. The temperature is therefore adapted between each part-step in such a way that the medium is still in the blue phase. In practice, this can be carried out by observing the sample under the polarising microscope after each irradiation operation of about 5 s or longer. If the sample becomes darker, this indicates a transition into the isotropic phase. The temperature for the next part-step is reduced correspondingly. The entire irradiation time which results in maximum stabilisation is typically 180 s at the irradiation power indicated. Further polymerisations can be carried out in accordance with an optimised irradiation/temperature programme. Alternatively, the polymerisation can also be carried out in a single irradiation step, in particular if an insufficiently broad blue phase is already present before the polymerisation.

Electro-Optical Characterisation

After the above-described polymerisation and stabilisation of the blue phase, the phase width of the blue phase is determined. The electro-optical characterisation is subsequently carried out at various temperatures within and, if desired, also outside this range.

The test cells used are fitted on one side with interdigital electrodes on the cell surface. The cell gap, the electrode separation and the electrode width are typically each 1 to 10 microns and are preferably of the same size. This uniform dimension is referred to below as the gap width. The area covered by electrodes is about 0.4 cm$^2$. The test cells do not have an alignment layer. For the electro-optical characterisation, the cell is located between crossed polarising filters, where the longitudinal direction of the electrodes adopts an angle of 45° to the axes of the polarising filter. The measurement is carried out using a DMS301 (Autronic-Melchers) at right angles to the cell plane or by means of a highly sensitive camera on the polarising microscope. In the voltage-free state, the arrangement described gives an essentially dark image (definition 0% transmission).

Firstly, the characteristic operating voltages and then the response times are measured on the test cell. The operating voltage at the cell electrodes is applied in the form of a rectangular voltage with alternating sign (frequency 100 Hz) and variable amplitude, as described below.

The transmission in the voltage-free state is defined as 0%. The transmission is measured while the operating voltage is increased. The achievement of the maximum value of about 100% intensity defines the characteristic quantity of the operating voltage, $V_{100}$. Equally, the characteristic voltage $V_{10}$ at 10% of maximum transmission is determined. These values are optionally measured at various temperatures in the region of the blue phase, in any case at room temperature (20° C.).

At the lower end of the temperature range of the blue phase, relatively high characteristic operating voltages $V_{100}$ are observed. At the upper end of the temperature range (close to the clearing point), the value of $V_{100}$ increases considerably. In the region of the minimum operating voltage, $V_{100}$ generally only increases slowly with the temperature. This temperature range, limited by $T_1$ and $T_2$, is known as the usable, flat temperature range (FR). The width of this 'flat range' (FR) is $(T_2-T_1)$ and is known as the width of the flat range (WFR). The precise values of $T_1$ and $T_2$ are determined by the intersections of tangents at the flat curve section FR and the adjacent steep curve sections in the $V_{100}$/temperature diagram.

In the second part of the measurement, the response times are determined during switching on and off ($\tau_{on}$, $\tau_{off}$. The response time $\tau_{on}$ is defined by the time taken to achieve 90% intensity after application of a voltage at the level of $V_{100}$ at the selected temperature. The response time $\tau_{off}$ is defined by the time taken to decrease by 90% starting from maximum intensity at $V_{100}$ after reduction of the voltage to 0 V. The response time is also determined at various temperatures in the region of the blue phase.

As further characterisation, the transmission can be measured at a temperature within the FR with a continuously varied operating voltage between 0 V and $V_{100}$. On comparison of the curves for increasing and for decreasing operating voltage, hysteresis may occur. The difference in the transmissions at $0.5 \cdot V_{100}$ and the difference in the voltages at 50% transmission are, for example, characteristic hysteresis values and are known as $\Delta T_{50}$ and $\Delta V_{50}$ respectively.

As a further characteristic quantity, the ratio of the transmission in the voltage-free state before and after passing through a switching cycle can be measured. This transmission ratio is known as the "memory effect". The value of the memory effect in the ideal state is 1.0. Values above 1 mean that a certain memory effect is present in the form of excessive residual transmission after the cell has been switched on and off. This value is also determined in the working range of the blue phase (FR).

The measurement values, unless indicated otherwise, are determined at 20° C.

MIXTURE EXAMPLES

Mixture Example 1

Host Mixture

| Component | % by wt. |
|---|---|
| AUUQU-2-F | 10 |
| AUUQU-3-F | 11 |
| AUUQU-4-F | 7 |
| AUUQU-5-F | 6 |
| AUUQU-7-F | 7 |
| AUUQU-3-T | 10 |
| AUUQU-3-OT | 11 |
| AGUQU-3-F | 4 |
| AUUQU-3-N | 5 |
| GUQGU-2-T | 7 |
| GUQGU-3-T | 7 |
| GUQGU-4-T | 7 |
| GUQGU-5-T | 8 |

Clearing point: 71° C.,
$\Delta\epsilon \cdot \Delta n$: 39.5.

Mixture Example 2

Host Mixture

| Component | % by wt. |
|---|---|
| AUUQU-2-F | 10 |
| AUUQU-3-F | 8 |
| AUUQU-5-F | 6 |
| AUUQU-3-T | 8 |
| AUUQU-3-OT | 8 |
| PUZU-2-F | 5 |
| PUZU-3-F | 5 |
| PUZU-5-F | 5 |
| AGUQU-3-F | 4 |
| AUUQU-3-N | 5 |
| GUQGU-2-T | 9 |
| GUQGU-3-T | 9 |
| GUQGU-4-T | 9 |
| GUQGU-5-T | 9 |

Clearing point: 76.5° C.,
$\Delta\epsilon \cdot \Delta n$: 61.3.

Mixture Example 3

Host Mixture

| Component | % by wt. |
|---|---|
| AUUQU-3-F | 8 |
| AUUQU-5-F | 6 |
| AUUQU-3-T | 6 |
| AUUQU-4-T | 5 |
| AUUQU-3-OT | 8 |
| PUZU-2-F | 5 |
| PUZU-3-F | 5 |
| PUZU-5-F | 5 |
| AGUQU-3-F | 4 |
| GUQGU-2-T | 12 |
| GUQGU-3-T | 12 |
| GUQGU-4-T | 12 |
| GUQGU-5-T | 12 |

Clearing point: 77° C.,
$\Delta\epsilon \cdot \Delta n$: 53.8.

Mixture Example 4

A typical polymer-stabilisable mixture has the composition as shown in the table:

| Component | % by weight |
|---|---|
| Host mixture (1, 2, 3) | 85 |
| IN-1 | 0.2 |
| Monoreactive mesogen (RM-2/RM-3) | 5 |
| Direactive mesogen (RM220/RM257) | 6 |
| Chiral dopant DP-1 | 3.8 |

The polymerisable mixture is polymerised in a single irradiation step at a temperature of about 30-50° C. at the lower end of the temperature range of the blue phase (details cf. above).

The polymer-stabilised liquid-crystalline media exhibit a blue phase over a broad temperature range.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102010015369.9, filed Apr. 17, 2010 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A compound of formula I

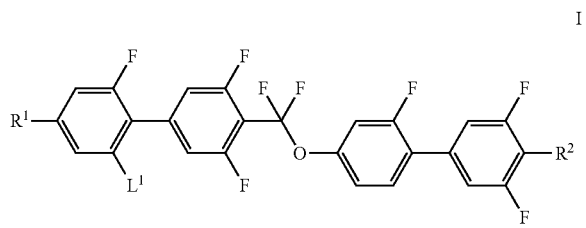

in which
L¹ denotes H or F,
R¹ denotes an unsubstituted alkyl radical having 1 to 15 C atoms, in which one or more $CH_2$ groups are each optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, and
R² denotes $CF_3$ or $OCF_3$.

2. A compound according to claim 1, wherein L¹ denotes a hydrogen atom.

3. A compound according to claim 1, wherein R² denotes a group $CF_3$.

4. A compound according to claim 1, wherein
R¹ denotes an alkyl radical having 1 to 15 C atoms, in which one or more $CH_2$ groups are each optionally replaced, independently of one another, by —C≡C—, —CH=CH—, —(CO)O—, —O(CO)—, —(CO)— or —O— in such a way that O atoms are not linked directly to one another.

5. A compound according to claim 1, wherein
R¹ denotes a straight-chain alkyl radical having 1 to 12 C atoms.

6. A compound according to claim 1, wherein
R¹ denotes a straight-chain alkyl radical having 3 C atoms.

7. A process for preparing a compound of formula I according to claim 1, comprising reacting a compound of formula A with a compound of formula B in the presence of a transition-metal catalyst

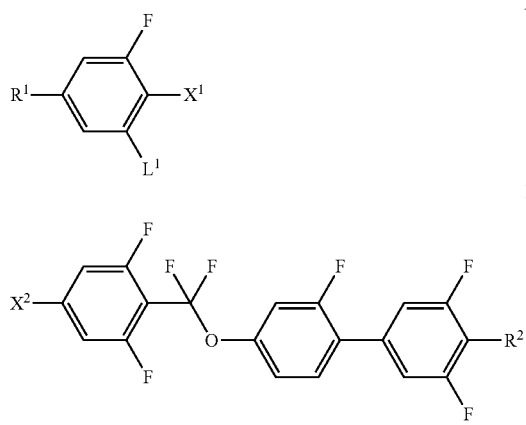

in which R¹, R² and L¹ are as defined for formula I, and
one of X¹ and X² denotes —$B(OH)_2$, a boronic acid ester or a boronate salt, and
the other denotes Cl, Br, I or —$O(SO_2)CF_3$.

8. A liquid-crystalline medium, comprising one or more compounds of formula I according to claim 1, and at least one further liquid-crystalline compound.

9. A liquid-crystalline medium according to claim 8, further comprising one or more compounds of formula II and/or III:

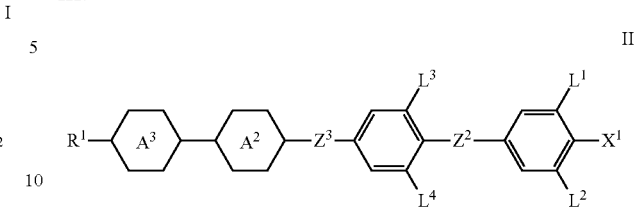

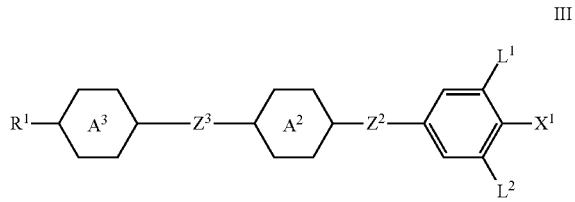

in which
R¹ denotes an unsubstituted alkyl radical having 1 to 15 C atoms, in which one or more $CH_2$ groups are each optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
$A^2$, $A^3$ independently of one another, denote

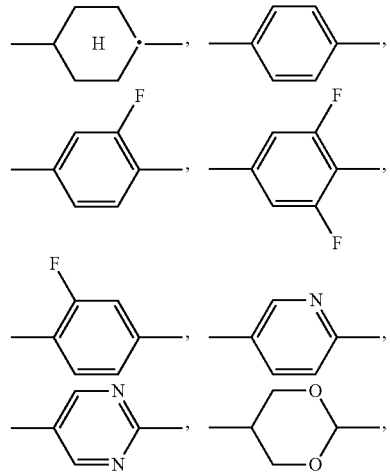

$Z^2$, $Z^3$ independently of one another, denote a single bond, $CF_2O$, $CH_2CH_2$, $CF_2CH_2$, $CF_2CF_2$, CFHCFH, $CFHCH_2$, (CO)O, $CH_2O$, C≡C, CH=CH, CF=CH, or CF=CF, where asymmetrical bonding units may be oriented in either of both possible directions,
X¹ denotes F, Cl, CN, or alkyl, alkenyl, alkenyloxy, alkoxyalkyl or alkoxy having 1 to 3 C atoms, which is mono- or polysubstituted by F, and
L¹ to L⁴ independently of one another, denote H or F.

10. A liquid-crystalline medium according to claim 8, wherein in the compound of formula II or III, R¹ is a straight-chain alkyl radical having 2 to 7 carbon atoms.

11. An electro-optical display device containing a liquid-crystalline medium according to claim 8.

12. An electro-optical display device according to claim 11, which operates entirely or partly in the region of the liquid-crystalline blue phase.

13. A compound according to claim 1, wherein R² denotes a group $OCF_3$.

14. A compound according to claim 1, wherein L¹ denotes F.

15. A compound according to claim 1, which is
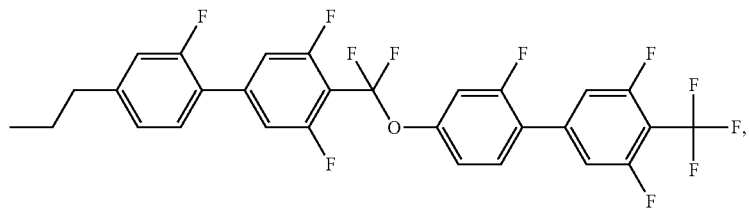
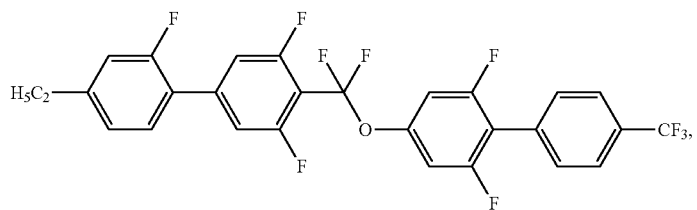
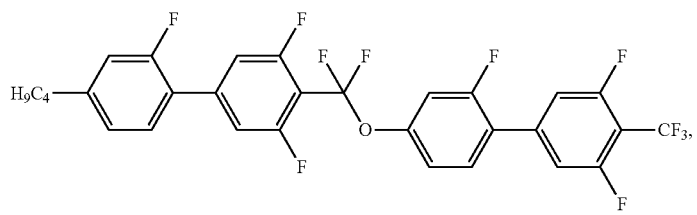
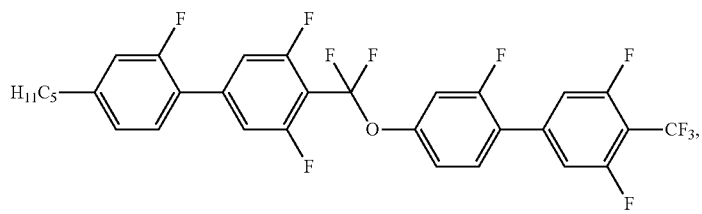
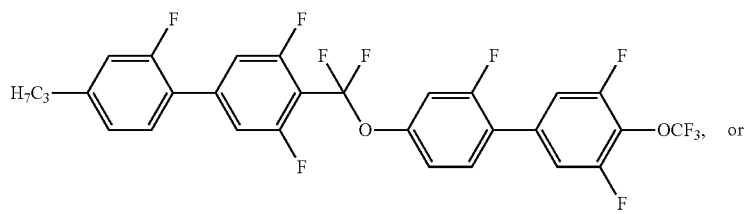
or
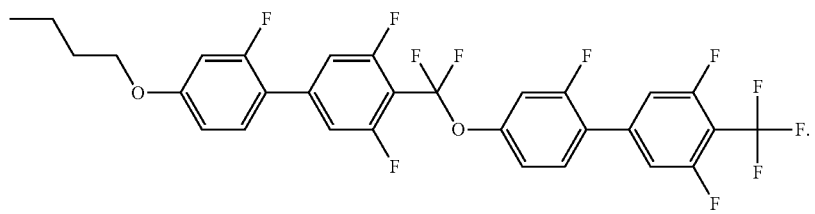

16. A liquid-crystalline medium, comprising one or more compounds of claim 15, and at least one further liquid-crystalline compound.

17. An electro-optical display device containing a liquid-crystalline medium according to claim 16, which operates entirely or partly in the region of the liquid-crystalline blue phase.

18. A compound according to claim 1, which is

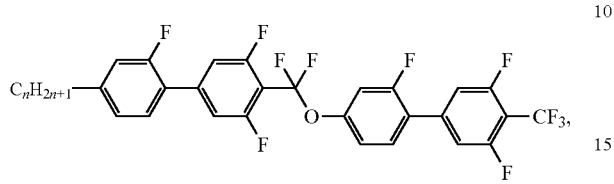

wherein n is 2, 3, 4 or 5.

19. A liquid-crystalline medium, comprising one or more compounds of claim 18, and at least one further liquid-crystalline compound.

20. An electro-optical display device containing a liquid-crystalline medium according to claim 19, which operates entirely or partly in the region of the liquid-crystalline blue phase.

* * * * *

UNITED STATES PATENT AND TRADEMARK OFFICE
CERTIFICATE OF CORRECTION

PATENT NO. : 8,551,359 B2
APPLICATION NO. : 13/086657
DATED : October 8, 2013
INVENTOR(S) : Axel Jansen et al.

It is certified that error appears in the above-identified patent and that said Letters Patent is hereby corrected as shown below:

IN THE CLAIMS:

Column 27, second compound (Claim 15) presents as:

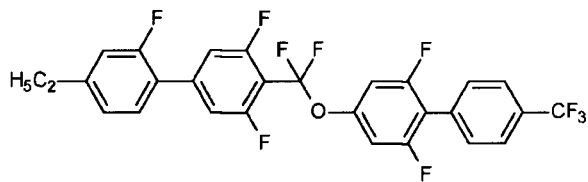

Should present as:

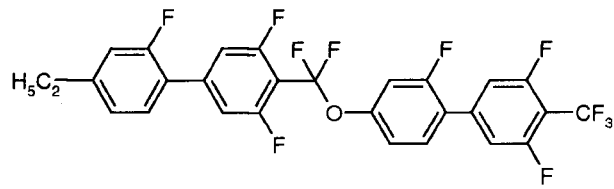

Signed and Sealed this
Thirty-first Day of December, 2013

Margaret A. Focarino
*Commissioner for Patents of the United States Patent and Trademark Office*